United States Patent
Van Hout et al.

(10) Patent No.: US 9,822,273 B2
(45) Date of Patent: Nov. 21, 2017

(54) RADIATION-CURABLE INKJET INK COMPOSITION

(71) Applicant: Océ Holding B.V., Venlo (NL)

(72) Inventors: Richard F. E. Van Hout, Venlo (NL); Richard Van Hameren, Venlo (NL); Bas Venderbosch, Venlo (NL)

(73) Assignee: OCÉ HOLDING B.V., Venlo (NL)

( * ) Notice: Subject to any disclaimer, the term of this patent is extended or adjusted under 35 U.S.C. 154(b) by 0 days.

(21) Appl. No.: 15/440,333

(22) Filed: Feb. 23, 2017

(65) Prior Publication Data

US 2017/0260410 A1    Sep. 14, 2017

(30) Foreign Application Priority Data

Mar. 9, 2016  (EP) .................................. 16159304

(51) Int. Cl.

| | |
|---|---|
| *G01D 11/00* | (2006.01) |
| *C09D 11/38* | (2014.01) |
| *C09D 11/101* | (2014.01) |
| *C09D 11/107* | (2014.01) |
| *B41J 11/00* | (2006.01) |
| *B41J 2/01* | (2006.01) |

(52) U.S. Cl.
CPC ............... *C09D 11/38* (2013.01); *B41J 2/01* (2013.01); *B41J 11/002* (2013.01); *C09D 11/101* (2013.01); *C09D 11/107* (2013.01)

(58) Field of Classification Search
CPC ...... C09D 11/101; C09D 11/38; C09D 11/322; C09D 11/30; C09D 11/00; C09D 11/107; C09D 11/40; B41J 11/002; B41J 2/01
USPC ...................... 347/100, 102; 106/31.13, 31.6
See application file for complete search history.

(56) References Cited

U.S. PATENT DOCUMENTS

| | | | |
|---|---|---|---|
| 8,669,298 B1 | 3/2014 | Vanbesien et al. | |
| 9,074,105 B2* | 7/2015 | Vanbesien | C09D 11/101 |
| 9,469,127 B2* | 10/2016 | Wetjens | B41J 11/002 |
| 2007/0123723 A1 | 5/2007 | Odell et al. | |
| 2009/0136681 A1 | 5/2009 | Belelie et al. | |
| 2012/0287212 A1* | 11/2012 | Chretien | C09D 11/101 |
| | | | 347/102 |
| 2014/0123873 A1 | 5/2014 | Chopra et al. | |

OTHER PUBLICATIONS

European Search Report for EP 16159304 dated Sep. 6, 2016.
Matsunaga et al., "Design of Novel Mesomorphic Compounds: N,N', N"-Trialkyl-1,3,5-benzenetricarboxamides", Bull. Chem. Soc. Jpn., 1988, vol. 61, No. 1, pp. 207-210.

* cited by examiner

*Primary Examiner* — Jannelle M Lebron
(74) *Attorney, Agent, or Firm* — Birch, Stewart, Kolasch & Birch, LLP

(57) ABSTRACT

The present invention relates to a radiation curable ink composition comprising a gellant. The present invention further relates to an ink set comprising such ink composition. The present invention further relates to a method for making such ink composition and a printing method using such ink composition.

10 Claims, 1 Drawing Sheet

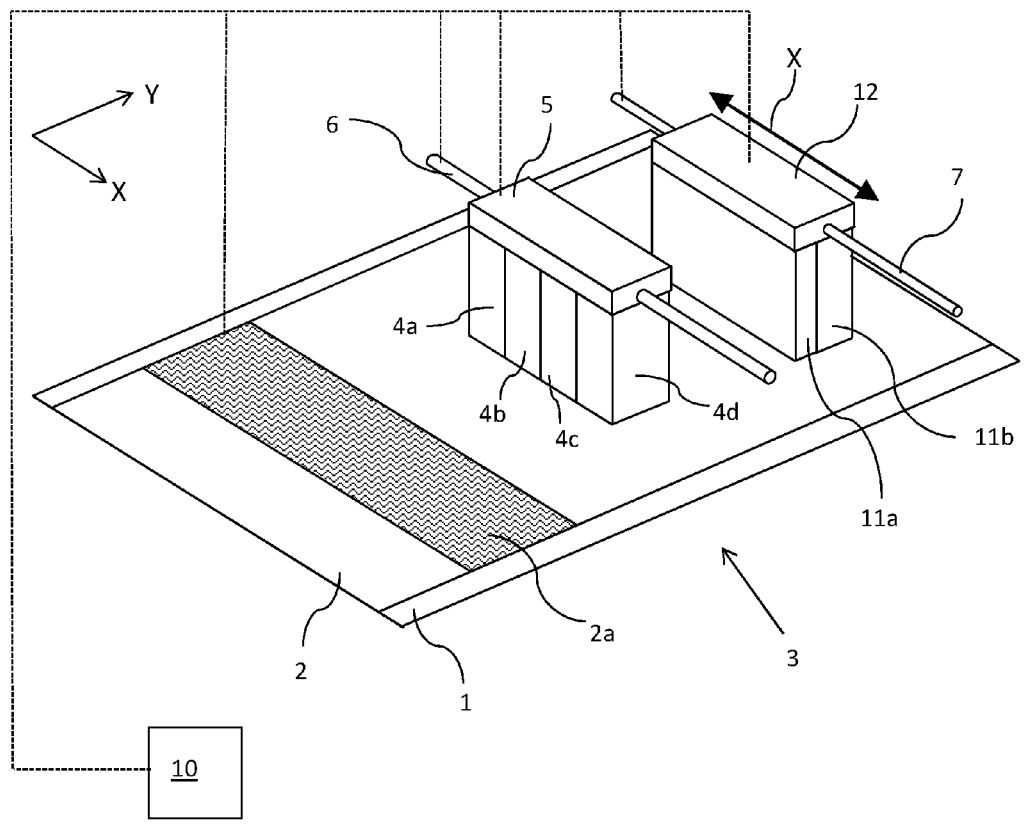
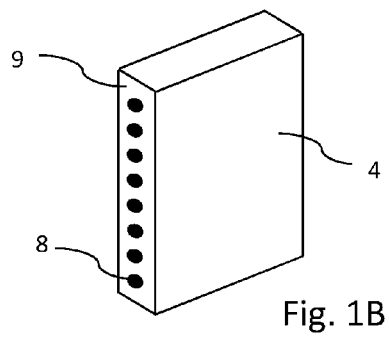
Fig. 1A
Fig. 1B

RADIATION-CURABLE INKJET INK COMPOSITION

The present invention relates to an ink composition and to an ink set comprising such ink composition. The present invention further relates to a method for preparing an ink composition. In addition, the present invention relates to a method for applying an image onto a recording medium.

BACKGROUND OF THE INVENTION

Radiation-curable inkjet ink compositions are known in the art. These ink compositions comprise one or more radiation-curable components. A special class of radiation-curable inkjet ink compositions are phase change radiation-curable inkjet ink compositions. These inks are fluid at elevated temperature and become solid—even if not yet cured—at lower temperatures. These inks are typically jetted at elevated temperatures. Phase change inks may become solid or semi-solid upon cooling down on a recording medium, e.g. a sheet of paper. As a result, spread of a droplet of ink on the recording medium may be decreased and color bleeding may be prevented. An example of a phase change radiation-curable inkjet ink is a gelling radiation-curable inkjet ink. Gelling radiation-curable inkjet ink compositions typically comprise a gellant. Gellants are also known in the art as gelling agents or thickeners. Examples of gellants used in gelling radiation curable inkjet ink compositions are waxes, such as natural waxes and long chain carboxylic acids, and ketones. The presence of a gellant can cause a viscosity increase in the inkjet ink composition upon cooling of the ink composition. The viscosity increase in the ink composition should be sufficient, to adequately control droplet spreading.

A disadvantage of gellants is that images printed using an ink composition comprising such gellant generally show low or medium gloss level, while high gloss is desired for images printed using a radiation curable ink. There is a need for gelling radiation curable ink compositions that provide high gloss images.

It is therefore an object of the present invention to provide a gelling radiation curable ink composition that provides high gloss images.

Further, it is an object of the invention to provide a radiation-curable inkjet ink composition that undergoes a sufficient increase in viscosity upon cooling down on a recording medium.

SUMMARY OF THE INVENTION

The object of the invention is achieved in a radiation-curable inkjet ink composition, wherein the gellant is a compound according to formula I,

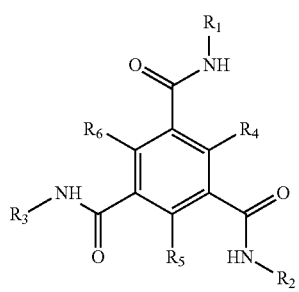

formula I wherein $R_1$, $R_2$ and $R_3$ are each independently selected from an alkyl, an arylalkyl, an alkenyl and a $R'(OCH_2CHR'')_n$— group, wherein $R'$ is an alkyl group having 1-4 carbon atoms, $R''$ is selected from a hydrogen atom, a methyl group or an ethyl group and n is an integer in the range of 1-10 and wherein $R_4$, $R_5$ and $R_6$ are each independently selected from a hydrogen atom and an alkyl group having 1-4 carbon atoms.

Radiation-Curable Medium

The radiation-curable inkjet ink composition may comprise a radiation-curable medium. The radiation-curable medium may comprise at least one radiation-curable component. A radiation-curable component is a component that may react (e.g. polymerize) under influence of suitable radiation, such as electromagnetic radiation, e.g. ultraviolet (UV) radiation. Examples of radiation-curable components are epoxides and (meth)acrylates. (Meth-)acrylates may comprise one or more reactive groups for forming an acrylate polymer. The radiation-curable medium may comprise one type of radiation curable compound or alternatively, the radiation-curable medium may comprise a mixture of radiation-curable compounds.

The radiation-curable medium may further comprise at least one inhibitor. An inhibitor is a component that prevent (inhibits) unwanted polymerization of the radiation-curable compound. Inhibitors may be added to the radiation curable inkjet ink composition to increase the shelf life of the ink composition.

The radiation-curable medium may further comprise at least one photo initiator. A photo initiator is a component that improves the efficiency of curing; i.e. increases the polymerization rate when the ink composition is irradiated with suitable radiation, such as UV radiation.

The radiation-curable medium may further comprise a solvent, such as water or an organic solvent. The solvent may be added to the radiation curable medium to tune ink properties, such as viscosity.

Further, additional components may be added to the radiation curable medium. For example, the radiation curable medium may comprise surfactants, antibacterial components and anti-fungi components.

Colorant

The radiation curable inkjet ink composition may further comprise a colorant, such as a pigment, a dye or a mixture thereof. Further, the radiation curable inkjet ink composition may comprise a mixture of dyes and/or a mixture of pigments. The colorant may provide the ink composition with a predetermined color.

Gellant

The radiation-curable inkjet ink composition may further comprise a gellant. According to the present invention the gellant is a compound according to formula

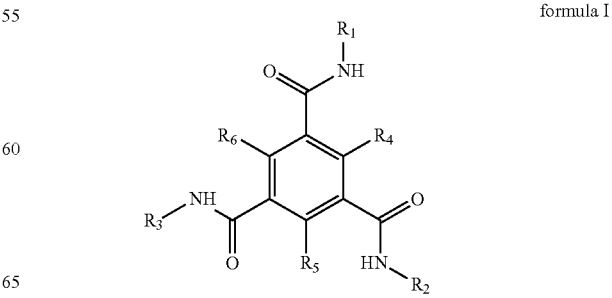

formula I wherein $R_1$, $R_2$ and $R_3$ are each independently selected from an alkyl, an arylalkyl, an alkenyl group and a $R'(OCH_2CHR'')_n$— group, wherein R' is an alkyl group having 1-4 carbon atoms, R'' is selected from a hydrogen atom, a methyl group or an ethyl group and n is an integer in the range of 1-10 and wherein $R_4$, $R_5$ and $R_6$ are each independently selected from a hydrogen atom and an alkyl group having 1-4 carbon atoms.

Preferably, $R_1$, $R_2$ and $R_3$ each may be independently selected from an alkyl group, an alkenyl group or an alkylarylgroup. When any of the functional group $R_1$, $R_2$ and $R_3$ comprises an aromatic unit, then pi-pi-interaction may occur. Pi-pi interaction may assist in forming the intermolecular network upon cooling of the ink composition comprising the ester compound, which may be beneficial for the increase in viscosity of the ink composition when cooling down.

Each one of the group $R_1$, $R_2$ and $R_3$ may be a group comprising 5-40 carbon atoms, preferably 10-25. When two or more of the functional groups $R_1$, $R_2$ and $R_3$ comprise less than 5 carbon atoms, then the compound may not show gelling behavior at printing conditions. When any of the functional groups $R_1$, $R_2$ and $R_3$ comprises more than 40 carbon atoms, then the viscosity of the ink composition comprising this compound may be too high at jetting conditions, which may hamper the jetting of the inkjet ink composition. The compound may comprise only one type of functional group $R_1$, $R_2$ and $R_3$. Alternatively, the compound may comprise a plurality of different functional groups $R_1$, $R_2$ and $R_3$.

It was found that radiation-curable inks comprising such gellant may form a strong gel upon cooling down. Further, radiation-curable inks comprising such gellant may form high gloss images when used in an inkjet printing process.

In an embodiment, $R_4$, $R_5$ and $R_6$ each represent a hydrogen atom. Compounds according to formula I, wherein $R_4$, $R_5$ and $R_6$ each represent a hydrogen atom are also referred to as 1,3,5-benzenetricarboxamides.

In an embodiment, $R_1$, $R_2$ and $R_3$ are each independently selected from an alkyl group having 8-25 carbon atoms. Components according to formula I, wherein $R_1$, $R_2$ and $R_3$ are each a long chain alkyl group, e.g. an alkyl group comprising 8-25 carbon atoms provide good gelling properties. When forming a network in a fluid ink vehicle, the long chain alkyl groups may interact via so-called Van der Waals forces, which may increase the strength of the gelled network. The length of the alkyl chains may influence the properties of the gellant, which may influence i.e. the gelling temperature, which is the temperature below which a gel is formed. The optimal chain length may depend e.g. on the parameters of the printing process and the nature of the radiation-curable inkjet ink composition.

In a further embodiment, $R_1$, $R_2$ and $R_3$ are the same. In such case, the symmetry of the gellant molecule is increased, which may increase the strength of the intermolecular forces between gellant molecules. The stronger the intermolecular forces between gellant molecules, the stronger the gel formed.

In a further embodiment, $R_4$, $R_5$ and $R_6$ each represent a hydrogen atom and $R_1$, $R_2$ and $R_3$ are the same and each represent a long chain alkyl.

For example $R_1$, $R_2$ and $R_3$ may each represent a dodecyl group. In that case, the name of the gellant is: N,N',N''-tridodecyl-1,3,5-benzenetricarboxamide. In another example, $R_1$, $R_2$ and $R_3$ may each represent a tetradecyl group (N,N',N''-tritetradecyl-1,3,5-benzenetricarboxamide). Alternatively, $R_1$, $R_2$ and $R_3$ may each represent a hexadecyl group (N,N',N''-trihexadecyl-1,3,5-benzenetricarboxamide).

In a further alternative, $R_1$, $R_2$ and $R_3$ may each represent a octadecyl group (N,N',N''-trioctadecyl-1,3,5-benzenetricarboxamide).

In an embodiment, the gellant is present in an amount of 0.2 wt %-3.0 wt % based on the total weight of the radiation-curable inkjet ink composition. For example, the gellant may be present in an amount of 0.5 wt %-2.5 wt % based on the total weight of the radiation-curable inkjet ink composition, such as from 1.0 wt %-2.0 wt % based on the total weight of the radiation-curable inkjet ink composition.

It was surprisingly found that a small amount of the gellant in accordance with the present invention may suffice to efficiently increase the viscosity of the radiation curable inkjet ink composition in between jetting of a droplet onto a recording medium and curing of the ink by irradiation.

Gellants may form three dimensional structures below a gelling temperature. Hence, when the inkjet ink composition is gelled, a three dimensional structure of the gellant may form in the inkjet ink composition. Such three dimensional structure may comprise crystals. The presence of crystals may decrease the gloss level of a print made using the inkjet ink composition. Therefore, decrease of the gloss level may be prevented by using only small amounts of gellant, for example 0.2 wt %-3.0 wt % based on the total weight of the radiation-curable inkjet ink composition.

In an embodiment, the radiation curable component is an acrylate having two or more acrylate functional groups. An acrylate may undergo a polymerization reaction when irradiated by suitable radiation, such as UV radiation. Hence, a polyacrylate polymer may be formed when an inkjet ink composition comprising an acrylate is cured, thereby hardening the ink. An acrylate molecule having two or more acrylate functional groups may react with two or more other acrylate molecules and hence, a polymeric network may be formed. Examples of acrylates having two or more acrylate functional groups are known in the art.

In a further embodiment, the ink composition further comprises a monofunctional acrylate. Presence of a monofunctional acrylate may improve the hardness and flexibility of the ink layer after curing.

In an embodiment, an ink set is provided, wherein the ink set comprises a radiation-curable inkjet ink composition according to the present invention.

An ink set may comprise a plurality of different inks. For example, the ink set may be a CMYK ink set, comprising a Yellow, a Magenta, a Cyan and a blacK ink composition. At least one of the ink compositions in the ink set may be an ink comprising a gellant, wherein the gellant is a compound according to formula I as described above. Preferably, a plurality of the ink compositions in the ink set may comprise a gellant, wherein the gellant is a compound according to formula I as described above. The ink set may further comprise additional colors, such as white, red, green, light magenta, light cyan and/or grey. Further, the ink set may comprise one or more metallic ink compositions. Optionally, the ink set may comprise an undercoat and/or an overcoat composition.

An ink set, wherein at least one of the inkjet ink compositions comprises a gellant in accordance with the present invention may allow printing images having good image quality and high gloss.

In an aspect of the invention, use of a component according to formula I in a radiation-curable inkjet ink composition is provided,

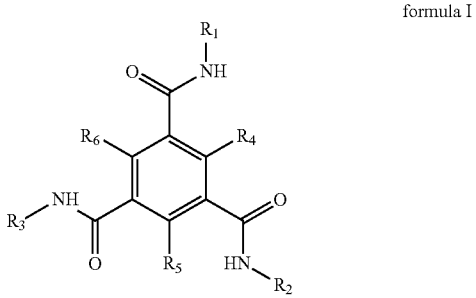

formula I wherein $R_1$, $R_2$ and $R_3$ are each independently selected from an alkyl, an arylalkyl, an alkenyl group and a $R'(OCH_2CHR'')_n$— group, wherein $R'$ is an alkyl group having 1-4 carbon atoms, $R''$ is selected from a hydrogen atom, a methyl group or an ethyl group and n is an integer in the range of 1-10 and wherein $R_4$, $R_5$ and $R_6$ are each independently selected from a hydrogen atom and an alkyl group having 1-4 carbon atoms.

Such component may be suitably used in radiation-curable inkjet ink composition as a gellant.

In an aspect of the invention, a method for preparing a radiation-curable inkjet ink composition is provided, the method comprising the steps of:
providing a radiation-curable component;
providing gellant, wherein the gellant is a compound according to formula I,

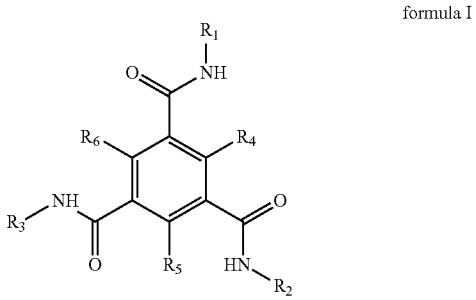

formula I wherein $R_1$, $R_2$ and $R_3$ are each independently selected
from an alkyl, an arylalkyl, an alkenyl group and a
$R'(OCH_2CHR'')_n$— group, wherein $R'$ is an alkyl group
having 1-4 carbon atoms, $R''$ is selected from a hydrogen atom, a methyl group or an ethyl group and n is an
integer in the range of 1-10 and wherein $R_4$, $R_5$ and $R_6$
are each independently selected from a hydrogen atom
and an alkyl group having 1-4 carbon atoms;
mixing the radiation curable component and the gellant.

The radiation-curable component and the gellant may be provided. Optionally, additional components may be provided, for example an additional solvent. The radiation-curable component and the gellant may be provided neat or they may be provided in a solution or dispersion. Optionally, a colorant may be provided. In case the colorant is a pigment, the pigment is preferably provided as a dispersion, such as an aqueous pigment dispersion. The components may be provided at once, or the components may be added subsequently. The components may be added in any suitable order. In case a dispersible component is added (e.g. a pigment), such dispersible component may be preferably added after the other components of the ink composition are provided. Mixing of the components may be carried out at any suitable temperature, for example room temperature.

In an aspect of the invention, a method for applying an image onto a recording medium is provided, the method comprising the steps of:
a. jetting droplets of a radiation-curable inkjet ink composition according to the present invention onto the recording medium;
b. curing the radiation-curable inkjet ink composition by irradiating the ink composition using UV radiation.

In the method, an image is applied onto a recording medium. In the method, in step a), an image is applied to the recording medium. The image may be applied using an ink composition according to the present invention. The ink composition may be applied onto the recording medium in a predetermined fashion, e.g. in accordance with image files stored on suitable storing means. The image may be applied for example by jetting droplets of the radiation-curable inkjet ink composition using an inkjet print head. The recording medium may be a sheet-like medium, such as a sheet of paper or a sheet of vinyl. Alternatively, the recording medium may be a web, for example an endless belt. The web may be made of a suitable material. Optionally, the image may be dried after it has been applied onto the intermediate transfer member.

In the method, in step b), the radiation-curable inkjet ink composition is cured by irradiating the ink composition using UV radiation. The inkjet ink composition may be irradiated using a suitable source of radiation, such as a halogen lamp, a mercury lamp and/or a LED lamp. Optionally, a plurality of sources of radiation may be used to irradiate the inkjet ink composition.

BRIEF DESCRIPTION OF THE DRAWINGS

These and further features and advantages of the present invention are explained hereinafter with reference to the accompanying drawings showing non-limiting embodiments and wherein:

FIG. 1A shows a schematic representation of an inkjet printing system.

FIG. 1B shows a schematic representation of an inkjet print head.

In the drawings, same reference numerals refer to same elements.

DETAILED DESCRIPTION OF THE DRAWINGS

FIG. 1A shows an ink jet printing assembly 3. The ink jet printing assembly 3 comprises supporting means for supporting an image receiving medium 2. The supporting means are shown in FIG. 1A as a flat surface 1, but alternatively, the supporting means may be a platen, for example a rotatable drum that is rotatable around an axis. The supporting means may be optionally provided with suction holes for holding the image receiving medium in a fixed position with respect to the supporting means. The ink jet printing assembly 3 comprises print heads 4a-4d, mounted on a scanning print carriage 5. The scanning print carriage 5 is guided by suitable guiding means 6 to move in reciprocation in the main scanning direction X. Each print head 4a-4d comprises an orifice surface 9, which orifice surface 9 is provided with at least one orifice 8, as is shown in FIG. 1B. The print heads 4a-4d are configured to eject droplets of marking material onto the image receiving medium 2.

The image receiving medium 2 may be a medium in web or in sheet form and may be composed of e.g. paper, cardboard, label stock, coated paper, plastic or textile. Alternatively, the image receiving medium 2 may also be an intermediate member, endless or not. Examples of endless members, which may be moved cyclically, are a belt or a drum. The image receiving medium 2 is moved in the sub-scanning direction Y over the flat surface 1 along four print heads 4a-4d provided with a fluid marking material.

The image receiving medium 2, as depicted in FIG. 1A is locally heated or cooled in the temperature control region 2a. In the temperature control region 2A, temperature control means (not shown), such as heating and/or cooling means may be provided to control the temperature of the receiving medium 2. Optionally, the temperature control means may be integrated in the supporting means for supporting an image receiving medium 2. The temperature control means may be electrical temperature control means. The temperature control means may use a cooling and/or heating liquid to control the temperature of the image receiving medium 2. The temperature control means may further comprise a sensor (not shown) for monitoring the temperature of the image receiving medium 2.

A scanning print carriage 5 carries the four print heads 4a-4d and may be moved in reciprocation in the main scanning direction X parallel to the platen 1, such as to enable scanning of the image receiving medium 2 in the main scanning direction X. Only four print heads 4a-4d are depicted for demonstrating the invention. In practice an arbitrary number of print heads may be employed. In any case, at least one print head 4a-4d per color of marking material is placed on the scanning print carriage 5. For example, for a black-and-white printer, at least one print head 4a-4d, usually containing black marking material is present. Alternatively, a black-and-white printer may comprise a white marking material, which is to be applied on a black image-receiving medium 2. For a full-color printer, containing multiple colors, at least one print head 4a-4d for each of the colors, usually black, cyan, magenta and yellow is present. Often, in a full-color printer, black marking material is used more frequently in comparison to differently colored marking material. Therefore, more print heads 4a-4d containing black marking material may be provided on the scanning print carriage 5 compared to print heads 4a-4d containing marking material in any of the other colors. Alternatively, the print head 4a-4d containing black marking material may be larger than any of the print heads 4a-4d, containing a differently colored marking material.

The carriage 5 is guided by guiding means 6. These guiding means 6 may be a rod as depicted in FIG. 1A. Although only one rod 6 is depicted in FIG. 1A, a plurality of rods may be used to guide the carriage 5 carrying the print heads 4. The rod may be driven by suitable driving means (not shown). Alternatively, the carriage 5 may be guided by other guiding means, such as an arm being able to move the carriage 5. Another alternative is to move the image receiving material 2 in the main scanning direction X.

Each print head 4a-4d comprises an orifice surface 9 having at least one orifice 8, in fluid communication with a pressure chamber containing fluid marking material provided in the print head 4a-4d. On the orifice surface 9, a number of orifices 8 are arranged in a single linear array parallel to the sub-scanning direction Y, as is shown in FIG. 1B. Alternatively, the nozzles may be arranged in the main scanning direction X. Eight orifices 8 per print head 4a-4d are depicted in FIG. 1B, however obviously in a practical embodiment several hundreds of orifices 8 may be provided per print head 4a-4d, optionally arranged in multiple arrays.

As depicted in FIG. 1A, the respective print heads 4a-4d are placed parallel to each other. The print heads 4a-4d may be placed such that corresponding orifices 8 of the respective print heads 4a-4d are positioned in-line in the main scanning direction X. This means that a line of image dots in the main scanning direction X may be formed by selectively activating up to four orifices 8, each of them being part of a different print head 4a-4d. This parallel positioning of the print heads 4a-4d with corresponding in-line placement of the orifices 8 is advantageous to increase productivity and/or improve print quality. Alternatively multiple print heads 4a-4d may be placed on the print carriage adjacent to each other such that the orifices 8 of the respective print heads 4a-4d are positioned in a staggered configuration instead of in-line. For instance, this may be done to increase the print resolution or to enlarge the effective print area, which may be addressed in a single scan in the main scanning direction X. The image dots are formed by ejecting droplets of marking material from the orifices 8.

The ink jet printing assembly 3 may further comprise curing means 11a, 11b. As shown in FIG. 1A, a scanning print carriage 12 carries the two curing means 11a, 11b and may be moved in reciprocation in the main scanning direction X parallel to the platen 1, such as to enable scanning of the image receiving medium 2 in the main scanning direction X. Alternatively, more than two curing means may be applied. It is also possible to apply page-wide curing means. If page-wide curing means are provided, then it may not be necessary to move the curing means in reciprocation in the main scanning direction X. The first curing means 11a may emit a first beam of UV radiation, the first beam having a first intensity. The first curing means 11a may be configured to provide the radiation for the pre-curing step. The second curing means 11b may emit a second beam of radiation, the second beam of radiation having a second intensity. The second curing means 11b may be configured to provide the radiation for the post-curing step.

The carriage 12 is guided by guiding means 7. These guiding means 7 may be a rod as depicted in FIG. 1A. Although only one rod 7 is depicted in FIG. 1A, a plurality of rods may be used to guide the carriage 12 carrying the print heads 11. The rod 7 may be driven by suitable driving means (not shown). Alternatively, the carriage 12 may be guided by other guiding means, such as an arm being able to move the carriage 12.

The curing means may be energy sources, such as actinic radiation sources, accelerated particle sources or heaters. Examples of actinic radiation sources are UV radiation sources or visible light sources. UV radiation sources are preferred, because they are particularly suited to cure UV curable inks by inducing a polymerization reaction in such inks. Examples of suitable sources of such radiation are lamps, such as mercury lamps, xenon lamps, carbon arc lamps, tungsten filaments lamps, light emitting diodes (LED's) and lasers. In the embodiment shown in FIG. 1A, the first curing means 11a and the second curing means 11b are positioned parallel to one another in the sub scanning direction Y. The first curing means 11a and the second curing means 11b may be the same type of energy source or may be different type of energy source. For example, when the first and second curing means 11a, 11b, respectively both emit actinic radiation, the wavelength of the radiated emitted by the two respective curing means 11a, 11b may differ or may be the same. The first and second curing means are depicted as distinct devices. However, alternatively, only one source of UV radiation emitting a spectrum of radiation may be used, together with at least two distinct filters. Each filter may absorb a part of the spectrum, thereby providing two beams of radiation, each one having intensity different from the other.

The flat surface 1, the temperature control means, the carriage 5, the print heads 4a-4d, the carriage 12 and the first and second curing means 11a, 11b are controlled by suitable controlling means 10.

EXPERIMENTS AND EXAMPLES

Materials

SR 9003 (propoxylated neopentyl glycol diacrylate) was obtained from Sartomer. Pentaerythritoltetrastearate was obtained from NOF as WE-6. Phenothiazine was obtained from Sigma Aldrich. Irgacure 819 was obtained from BASF. The black pigment dispersion, comprising 2.5 wt % of carbon black, was obtained from Sun Chemical. All chemicals were used as received.

N,N',N"-trihexadecyl-1,3,5-benzenetricarboxamide was prepared according the synthetic procedure disclosed in "Matsunaga, Y.; Miyajima, N.; Nakayasu, Y.; Sakai, S.; Yonenaga, M. *Bull. Chem. Soc. Jpn.*, 1988, 61, 207-210".

Methods

Viscosity

The complex viscosity is measured at 25 degrees Celsius using an Anton Paar MCR 301 rheometer, with flat plate geometry. The complex viscosity is measured at strains of 0.25%.

Gloss

The gloss of an image was measured after the ink-layer (14 μm) was cured. The gloss was measured using a micro-TRI glossmeter obtained from BYK-Gardner GmbH using the internal calibration and measurement method. The micro-TRI gloss measuring device simultaneously measures the gloss under an angle of 20°, 60° and 85°, respectively. The gloss level reported is the gloss level measured under an angle of 60°.

Rodcoating

Rodcoats were made by applying a 14 μm thick layer of ink onto a receiving medium. As receiving medium, Avery Dennison MP12000 was used. MP12000 is a self-adhesive vinyl medium.

The ink was cured by irradiating the ink layer using a LED lamp emitting radiation having a wavelength of 395 nm.

EXAMPLE AND COMPARATIVE EXAMPLE

Several ink compositions were prepared. The ink compositions were prepared by adding gelling agent to a radiation curable medium—wherein the radiation curable medium comprises 85 wt % of SR 9003 as radiation-curable monomer, 4.95 wt % Irgacure 819 as a photo-initiator, 9.9 wt % of pigment dispersion and 0.075 wt % of phenothiazine as an inhibitor- and mixing the components. The amount of gelling agent and of the radiation curable medium is shown in table 1. Ink compositions Ex 1 is an ink compositions according to the present invention and comprises N,N',N"-trihexadecyl-1,3,5-benzenetricarboxamide as a gelling agent. N,N',N"-trihexadecyl-1,3,5-benzenetricarboxamide will be further referred to as carboxamide.

Comparative ink composition CE 1 was prepared analogously; ink composition CE 1 comprises pentaerythritoltetrastearate as a gelling agent and is not an ink composition according to the present invention.

The ink compositions Ex 1 and CE 1 are summarized in table 1.

TABLE 1

| | Ink compositions | | |
|---|---|---|---|
| Ink compositions | radiation curable medium (gr) | carboxamide (gr) | pentaerythritol-tetrastearate (gr) |
| Ex 1 | 99 | 1 | 0 |
| CE 1 | 99 | 0 | 1 |

The viscosity of each one of the ink compositions Ex 1 and CE 1 was measured at a temperature of 25° C. The viscosity of the two ink compositions is shown in table 2. At 25° C., both ink compositions (Ex 1 and CE 1) are in a gelled state. The viscosity of the ink compositions in the gelled state correlates to the gel strength of the ink composition. The viscosity of ink composition Ex 1 was about 18 times as high as the viscosity of CE 1. Thus, the ink composition Ex 1, which is an ink composition according to the present invention, is able to efficiently gel the ink composition and thereby prevent phenomena such as color bleed. Preventing color bleed improves the print quality of a printed image. Without wanting to be bound to any theory, it is believed that a high viscosity may also provide a more even surface of the ink after the ink has been applied onto a recording medium, which may also improve the visual properties of a printed image.

TABLE 2

| Viscosity | |
|---|---|
| Ink compositions | Complex viscosity |
| Ex 1 | 9.2 Pa · s |
| CE 1 | 0.5 Pa · s |

Rodcoats were made using ink compositions Ex 1 and CE 1. The gloss of the rodcoats provided with the (cured) ink compositions was measured. The results are summarized in table 3.

TABLE 3

| Gloss levels | |
|---|---|
| Ink compositions | Gloss 60° |
| Ex 1 | 73 |
| CE 1 | 39 |

When comparing the gloss levels of a rod coat made with Ex 1 to a rod coat made with CE 1, it is observed that latter show a lower gloss level than the rod coat made with Ex 1. Thus, the ink composition according to the present invention can form images having an increased gloss level compared to the ink composition comprising pentaerythritoltetrastearate as gelling agent, which is not an ink composition according to the present invention. Hence, using ink compositions according to the present invention, high gloss levels can be obtained.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually and appropriately detailed structure. In particular, features presented and described in separate dependent claims may be applied in combination and any combination of such claims are herewith disclosed. Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention claimed is:

1. Radiation-curable inkjet ink composition comprising a gellant, wherein the gellant is a compound according to formula I,

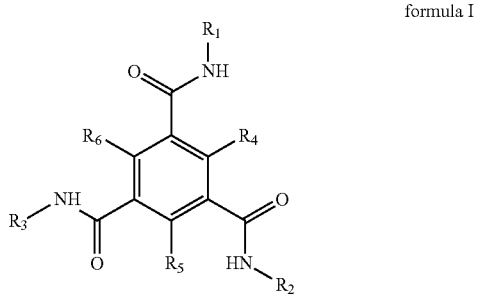

formula I wherein $R_1$, $R_2$ and $R_3$ are each independently selected from an alkyl, an arylalkyl, an alkenyl group and a $R'(OCH_2CHR'')_n$— group, wherein R' is an alkyl group having 1-4 carbon atoms, R" is selected from a hydrogen atom, a methyl group or an ethyl group and n is an integer in the range of 1-10 and wherein $R_4$, $R_5$ and $R_6$ are each independently selected from a hydrogen atom and an alkyl group having 1-4 carbon atoms.

2. Radiation-curable inkjet ink composition according to claim 1, wherein $R_4$, $R_5$ and $R_6$ each represent a hydrogen atom.

3. Radiation-curable inkjet ink composition according to claim 1, wherein $R_1$, $R_2$ and $R_3$ are each independently selected from an alkyl group having 8-25 carbon atoms.

4. Radiation-curable inkjet ink composition according to claim 3, wherein $R_1$, $R_2$ and $R_3$ are the same.

5. Radiation-curable inkjet ink composition according to claim 1, wherein the gellant is present in an amount of 0.2 wt %-3.0 wt % based on the total weight of the radiation-curable inkjet ink composition.

6. Radiation-curable inkjet ink composition according to claim 1, wherein the ink composition comprises an acrylate having two or more acrylate functional groups.

7. Radiation-curable inkjet ink composition according to claim 6, wherein the ink composition further comprises a monofunctional acrylate.

8. Ink set comprising a radiation-curable inkjet ink composition according to claim 1.

9. Method for preparing a radiation-curable inkjet ink composition according to claim 1, the method comprising the steps of:
   providing a radiation curable component;
   providing gellant, wherein the gellant is a compound according to formula I, wherein $R_1$, $R_2$ and $R_3$ are each independently selected from an alkyl, an arylalkyl, an alkenyl group and a $R'(OCH_2CHR'')_n$— group, wherein R' is an alkyl group having 1-4 carbon atoms, R" is selected from a hydrogen atom, a methyl group or an ethyl group and n is an integer in the range of 1-10 and wherein $R_4$, $R_5$ and $R_6$ are each independently selected from a hydrogen atom and an alkyl group having 1-4 carbon atoms;
   mixing the radiation curable component and the gellant.

10. Method for applying an image onto a recording medium, the method comprising the steps of:
   a. jetting droplets of a radiation-curable inkjet ink composition according to claim 1 onto the recording medium;
   b. curing the radiation-curable inkjet ink composition by irradiating the ink composition using UV radiation.

* * * * *